United States Patent
Chen et al.

(10) Patent No.: US 7,255,796 B2
(45) Date of Patent: Aug. 14, 2007

(54) METHOD OF PREVENTING HYDROGEN SULFIDE ODOR GENERATION IN AN AQUEOUS MEDIUM

(75) Inventors: Zhuo Chen, Yardley, PA (US); Wendy Segal, Burlington, NJ (US); David B. Ritz, Hatfield, PA (US); Wilson K. Whitekettle, Jamison, PA (US)

(73) Assignee: General Electric Company, Schenectady, NY (US)

( * ) Notice: Subject to any disclaimer, the term of this patent is extended or adjusted under 35 U.S.C. 154(b) by 372 days.

(21) Appl. No.: 10/887,045

(22) Filed: Jul. 8, 2004

(65) Prior Publication Data

US 2006/0006120 A1   Jan. 12, 2006

(51) Int. Cl.
    *C02F 1/20* (2006.01)
(52) U.S. Cl. .................... 210/750; 210/916; 422/5; 423/226
(58) Field of Classification Search .............. 210/916
    See application file for complete search history.

(56) References Cited

U.S. PATENT DOCUMENTS

| | | | | |
|---|---|---|---|---|
| 4,680,127 A | * | 7/1987 | Edmondson | 210/749 |
| 4,710,305 A | * | 12/1987 | Allison et al. | 210/747 |
| 5,028,340 A | * | 7/1991 | Gallup | 210/753 |
| 5,061,373 A | * | 10/1991 | Gallup | 210/697 |
| 6,059,973 A | * | 5/2000 | Hudson et al. | 210/610 |
| 6,063,346 A | * | 5/2000 | Luna | 423/220 |
| RE37,181 E | | 5/2001 | Hunniford et al. | |
| 6,261,459 B1 | * | 7/2001 | Waldmann | 210/666 |
| 6,666,975 B1 | * | 12/2003 | Chen et al. | 210/749 |
| 6,773,582 B2 | * | 8/2004 | Anthony | 210/188 |
| 6,942,037 B1 | * | 9/2005 | Arnold et al. | 166/312 |
| 7,078,005 B2 | * | 7/2006 | Smith et al. | 423/226 |

FOREIGN PATENT DOCUMENTS

| | | |
|---|---|---|
| FR | 2705957 A | 12/1994 |
| WO | WO 92/01481 A | 2/1992 |
| WO | WO 98/51625 A | 11/1998 |

OTHER PUBLICATIONS

EPO, Search Report for EP 05254297, Oct. 28, 2005, 6 pages.
Jacquez, Ricardo B., & El-Reyes, Hamdy H., "Biochemical Control Of Sulfide Production In Wastewater Collection Systems," Compendex Abstract, Aug. 1992, 1 page.

* cited by examiner

*Primary Examiner*—Peter A. Hruskoci
(74) *Attorney, Agent, or Firm*—Duane Morris LLP

(57) ABSTRACT

The present invention relates to a fast acting chemical treatment for preventing the generation of hydrogen sulfide odor by the microbial metabolic activities of sulfate reducing bacteria. Specifically, the invention relates to a method for preventing hydrogen sulfide odor generation in a sulfur species-containing aqueous medium, which includes adding to the aqueous medium an effective amount for the purpose of a sulfide scavenger treatment selected from the group consisting of glyoxal, triazine, n-chlorosuccinimide, and mixtures thereof.

4 Claims, No Drawings

METHOD OF PREVENTING HYDROGEN SULFIDE ODOR GENERATION IN AN AQUEOUS MEDIUM

FIELD OF THE INVENTION

The present invention relates to a fast-acting, aqueous phase chemical treatment for preventing the generation of hydrogen sulfide odor in an aqueous medium.

BACKGROUND OF THE INVENTION

The reactivity between various aldehydes and sulfidic compounds ($H_2S$, mercaptans, etc.) has been known in the art for some time. For example, Marks in U.S. Pat. No. 1,991,765 discloses a method of reacting hydrogen sulfide and an aldehyde in an aqueous solution having a pH between 2 and 12 at a temperature between substantially 20° C. and 100° C. After Marks' disclosure in 1935, many patents appeared disclosing the use of aldehydes during acid cleaning of iron sulfide deposits, including U.S. Pat. Nos. 2,606,873; 3,514,410; 3,585,069; 3,669,613; 4,220,550; 4,289,639; and 4,310,435. Consumption of the hydrogen sulfide liberated by acidification of sulfide-containing deposits increased the safety of such operations. Decreased corrosivity of the aldehyde-containing acids is also disclosed in the prior art, sometimes with the addition of ancillary corrosion inhibitors.

Menaul in U.S. Pat. No. 2,426,318 discloses a method of inhibiting the corrosive action of natural gas and oil containing soluble sulfides on metals by utilizing an aldehyde and preferably formaldehyde.

Roehm in U.S. Pat. No. 3,459,852 discloses a process for deodorizing and reducing the biochemical demand of an aqueous solution which contains at least one compound of hydrogen sulfide and compounds containing the —SH group. Roehm's process comprises mixing the solution with a sulfide-active alpha, beta unsaturated aldehyde or ketone in an amount sufficient to form sulfur-containing reaction product of the sulfide active aldehyde or ketone. Two such sulfide-active compounds disclosed by Roehm are acrolein and 3-buten-2-one.

Formaldehyde, formaldehyde with $SO_3^{-2}$, and acrolein are all commercially used hydrogen sulfide ($H_2S$) scavengers. However, formaldehyde produces a solid reaction product and reverts readily to formaldehyde and free $H_2S$. Acrolein is more expensive than formaldehyde as well as extremely toxic and dangerous to handle. The use of $SO_3^{-2}$ with formaldehyde eliminates the re-release of $H_2S$ but not solids formation.

Despite the prior art approaches to $H_2S$ scavenging, the provision of a product that can prevent the $H_2S$ formation microbiologically (rather than removal of $H_2S$ after it is formed) is highly desirable since it is a more effective way of controlling $H_2S$ odor and preventing corrosion and related problems. Existing $H_2S$ prevention methods that include utilizing biocides to kill microbes such as Sulfate Reducing Bacteria (SRBs) are non-selective and will kill other microorganisms, and may be detrimental to the wastewater remediation processes. These concerns are effectively negated by the utilization of the hydrogen sulfide prevention methods of the present invention, often combined with a $H_2S$ scavenging component chemical.

SUMMARY OF THE INVENTION

The present invention relates to a fast acting chemical treatment for preventing the generation of hydrogen sulfide odor by the microbial metabolic activities of sulfate reducing bacteria. Specifically, the invention relates to a method for preventing hydrogen sulfide odor generation in a sulfur species-containing aqueous medium, which comprises adding to the aqueous medium an effective amount for the purpose of a sulfide scavenger treatment selected from the group consisting of glyoxal, triazine, n-chlorosuccinimide, and mixtures thereof.

The present invention further relates to a method for controlling corrosion in a hydrogen sulfide-containing aqueous medium, which method comprises adding to the aqueous medium an effective amount for the purpose of the treatments noted above.

DESCRIPTION OF THE PREFERRED EMBODIMENTS

The present invention utilizes chemicals which can act as redox potential buffers to treat a liquid medium containing microorganisms (such as but not limited to sulfate reducing bacteria, or SRB), which can generate $H_2S$ odor by converting sulfur species of higher oxidation states to sulfides ($S^{2-}$). By the addition of a small but effective amount of such agents to the liquid (e.g., wastewater, cooling water or water/hydrocarbon emulsion) medium, the sulfide is not microbiologically produced. These agents are introduced in two different ways (alone or in combination) in order to maintain the system redox potential at a level which is less favorable for the microbials to produce $H_2S$. They function to: (1) quickly scavenge sulfide species generated so that the system redox potential will not further decrease as a result of $S^{2-}$ production; and (2) provide additional redox potential adjustment/maintenance by introducing mild oxidant and/or alternative nutrient sources for the microorganisms in the system.

Since $H_2S$ is a highly corrosive gas, preventing $H_2S$ from forming in systems such as cooling systems and storage tanks also provides an effective means of corrosion control. Further, in a preferred embodiment, the present invention relates to a method for preventing hydrogen sulfide odor generation in a hydrogen sulfide-containing aqueous medium, which comprises adding to the aqueous medium an effective amount for the purpose of a combination of (a) glyoxal and (b) a metal nitrate compound. Such materials, in a weight ratio of (a) to (b) of from about 1:3 to 1000:1, may be added to the aqueous medium in need of treatment. About 10 ppm of the treatment is preferably added to the aqueous medium, with an amount of treatment of from about 2-6 ppm being particularly preferred.

It has been found that the treatment of the present invention is effective and fast-acting in preventing the generation of hydrogen sulfide odor in an aqueous medium with a pH of from about 6.5 to 8. The preferred nitrate compound is magnesium nitrate, or $Mg(NO_3)_2$. A ratio of components (a) to (b) of about 3:1 is particularly preferred.

The invention will be further illustrated by the following examples, which are included as being illustrations of the invention and which should not be construed as limiting the scope thereof.

EXAMPLES

The test protocol was as follows: 100 mL serum bottles were filled with synthetic nutrient medium, then stoppered, capped, and autoclaved, and allowed to cool to at least 35C. Using a 1 mL syringe with needle, the treatment was added at desired dosages to prepared serum bottles (triplicates of each dosage). No treatment was added for baseline controls.

At least 6 baseline serum bottles were used. Using a 1 mL syringe with needle, 0.1 mL of prepared culture was added to each serum bottle.

Next, a $10^{10}$ cells/ml concentration of the sulfate reducers was prepared (using autoclaved synthetic nutrient medium) inside an anaerobic chamber. Using a 1 ml syringe with needle, 0.1 ml of the prepared sulfate reducers culture was added to each serum bottle. The bottles were then incubated at the desired temperature.

The baseline dissolved sulfide levels were then measured to determine if the samples were ready for efficacy analysis. Using a 30 mL syringe with needle, 30 mL of sample was removed from each serum bottle. About 25 mL of the sample was added to a 30 mL bottle containing 0.125 mL zinc acetate solution, followed by adding 1 mL of 1N NaOH. The sulfide in the fixed sample was then measured. The remaining 5 mL of sample in the syringe was used for pH determination. Separate field studies were also conducted.

As shown in Table I below, the treatments of the present invention are non-biocidal in nature, i.e., antimicrobial activities are not irreversibly affected after treatment. Furthermore, the treatments of the present invention do not result in a significant alteration of medium pH at appropriate dosages. Note that at application dosages for all chemical treatments listed, approximately 100% inhibition of $H_2S$ production was achieved (Glyoxal at 40% actives tested throughout).

TABLE I

Effect of treatment on medium pH and toxicity

| Chemical Treatment | Scavenger Dosage (ppm active) | Medium pH after Treatment | SRB Growth after Treatment | PetriFilm Count after Treatment |
|---|---|---|---|---|
| None | 0 | 6.5 | $10^8$ | $5.2 \times 10^8$ |
| Glyoxal | 8 | 6.5 | $10^8$ | $8.3 \times 10^8$ |
| Glyoxal:Mg(NO$_3$)$_2$ (3:1 ratio) | 8 | 6.5 | $10^8$ | $6.1 \times 10^8$ |
| Triazine | 8 | 6.5 | $10^8$ | $5.5 \times 10^8$ |
| Glutaraldehyde (registered biocide) | 200 | 7.5 | 0 | 0 |

As further shown in Table II below, the sulfide scavenger activity of the present invention is also effective in corrosion control.

TABLE II

Effect of treatment on corrosion rate reduction

| Corrosion Coupon | Treatment Dosage Glyoxal:Mg(NO$_3$)$_2$ (3:1 ratio) (ppm) | Corrosion Rate (mpy) | Corrosion Rate Reduction (%) |
|---|---|---|---|
| Mild Steel | 0 | 54 | — |
| Pre-treated Mild Steel | 0 | 46 | — |
| Mild Steel | 10 | 3.2 | 94.1 |
| Pre-treated Mild Steel | 10 | 3.5 | 92.4 |

As shown in Table III, the combination of sulfide scavenger (e.g., glyoxal) and nitrate provided enhanced $H_2S$ odor control at very low dosages. Note that nitrate compounds alone at the same application dosages resulted in no appreciable odor control effect.

TABLE III

Effectiveness of different scavenger blends on $H_2S$ inhibition using real municipal wastewater

| Chemical Treatment | Scavenger Dosage (ppm active) | Head Space $H_2S$, ppm |
|---|---|---|
| Field Study 1: | | |
| Glyoxal | 0.3 | 27 |
|  | 3.8 | 8 |
|  | 6.0 | 7 |
|  | 8 | 2 |
|  | 10 | 0.5 |
| Glyoxal:Mg(NO$_3$)$_2$ (3:1 ratio) | 0.3 | 27 |
|  | 2.4 | 2 |
|  | 3.5 | 1.5 |
|  | 4.3 | 1.5 |
|  | 5.7 | 2 |
| Mg(NO$_3$)$_2$ | 10 | 27 |
| Field Study 2: | | |
| Glyoxal | 0.5 | 47 |
|  | 4.0 | 12 |
|  | 6.0 | 0.1 |
|  | 8.0 | 0.1 |
|  | 10.0 | 5.0* |
| Glyoxal:Mg(NO$_3$)$_2$ (3:1 ratio) | 0.5 | 47 |
|  | 2.4 | 0.1 |
|  | 3.3 | 0.1 |
|  | 4.3 | 0.1 |
|  | 5.7 | 0.1 |
| Mg(NO$_3$)$_2$ | 10 | 47 |

*operational variation with this data point

The treatment of the present invention was also found to be stable with time and temperature, ranging from about 3° C. to about 35° C., although the present invention is expected to be effective within a temperature range of from about 0° C. to about 50° C.

While the present invention has been described with respect to particular embodiments thereof, it is apparent that numerous other forms and modifications of the invention will be obvious to those skilled in the art. The appended claims and this invention generally should be construed to cover all such obvious forms and modifications, which are within the true spirit and scope of the present invention.

We claim:

1. A method for preventing hydrogen sulfide odor generation in a sulfur species-containing aqueous medium, which comprises adding to the aqueous medium an effective amount for the purpose of a sulfide scavenger treatment including a non-biological combination of (a) glyoxal and (b) magnesium nitrate, wherein from about 2-6 ppm of the treatment is added to the aqueous medium, wherein said aqueous medium has a pH of about 6.5-8, and wherein the weight ratio of (a) to (b) is from about 1:3 to 1000:1.

2. The method as recited, in claim 1, wherein the addition is conducted at a temperature of from about 0° C. to about 50° C.

3. The method as recited in claim 1, wherein said aqueous medium comprises a wastewater medium.

4. The method as recited in claim 1, wherein the weight ratio of (a) to (b) is about 3:1.

* * * * *